United States Patent
Herring

(10) Patent No.: US 10,220,962 B2
(45) Date of Patent: Mar. 5, 2019

(54) DEVICE MOUNT

(71) Applicant: Scott Paul Herring, Genoa, NV (US)

(72) Inventor: Scott Paul Herring, Genoa, NV (US)

(73) Assignee: PEOVI, INC, Genoa, NV (US)

(*) Notice: Subject to any disclaimer, the term of this patent is extended or adjusted under 35 U.S.C. 154(b) by 0 days.

(21) Appl. No.: 15/681,364

(22) Filed: Aug. 19, 2017

(65) Prior Publication Data

US 2018/0050822 A1 Feb. 22, 2018

Related U.S. Application Data

(60) Provisional application No. 62/377,100, filed on Aug. 19, 2016.

(51) Int. Cl.
| | | |
|---|---|---|
| *G03B 15/00* | (2006.01) | |
| *B64D 47/08* | (2006.01) | |
| *F16B 2/06* | (2006.01) | |
| *F16M 11/18* | (2006.01) | |
| *G02B 27/64* | (2006.01) | |

(52) U.S. Cl.
CPC ............. *B64D 47/08* (2013.01); *F16B 2/065* (2013.01); *G03B 15/006* (2013.01); *B64C 2201/127* (2013.01); *F16M 11/18* (2013.01); *G02B 27/64* (2013.01); *G03B 15/00* (2013.01)

(58) Field of Classification Search
CPC ........................................................ G03B 15/00
USPC ............................................ 396/12; 359/818
See application file for complete search history.

(56) References Cited

U.S. PATENT DOCUMENTS

| | | | | |
|---|---|---|---|---|
| 5,419,522 | A * | 5/1995 | Luecke | F16C 11/106 248/288.51 |
| 7,272,904 | B2 * | 9/2007 | Larue | F41G 11/003 292/145 |
| 8,929,002 | B1 * | 1/2015 | Higaki | G02B 23/16 248/170 |
| 9,764,176 | B2 * | 9/2017 | Waterman | B01L 3/5088 |
| 2005/0167558 | A1 * | 8/2005 | Smith | F16M 11/10 248/317 |
| 2005/0237635 | A1 * | 10/2005 | Sugita | F16M 11/16 359/818 |
| 2013/0048792 | A1 * | 2/2013 | Szarek | B64C 39/024 244/175 |
| 2013/0051778 | A1 * | 2/2013 | Dimotakis | B64D 47/08 396/12 |
| 2014/0092371 | A1 * | 4/2014 | Nemura | G03B 21/142 353/101 |

(Continued)

OTHER PUBLICATIONS

Thorlabs, 'Manual Continuous Rotation Mounts', https://www.thorlabs.com, Sep. 11, 2013, 5 pages.*

*Primary Examiner* — Clayton E LaBalle
*Assistant Examiner* — Kevin Butler
(74) *Attorney, Agent, or Firm* — Ian Burns; ATIP Law

(57) ABSTRACT

A mount for a device such as a camera or similar equipment includes a rotational element that receives and secures the device within the rotational element. The rotational element has an outer circumference that provides an outer contact surface to the inner contact surface of a ring clamp. The ring clamp may clamp the rotational element and device in a wide array of selectable orientations. The ring clamp may include an attachment for attaching the ring clamp to a larger element.

17 Claims, 11 Drawing Sheets

(56) References Cited

U.S. PATENT DOCUMENTS

| | | | |
|---|---|---|---|
| 2014/0367535 A1* | 12/2014 | Rost | F16M 11/10 |
| | | | 248/122.1 |
| 2015/0281650 A1* | 10/2015 | Mohan | H04N 5/2254 |
| | | | 348/143 |
| 2016/0009371 A1* | 1/2016 | Atzert | B64C 1/36 |
| | | | 244/118.1 |
| 2016/0121155 A1* | 5/2016 | Waterman | B01J 19/0046 |
| | | | 472/47 |
| 2016/0294996 A1* | 10/2016 | Yen | H04M 1/04 |
| 2017/0048439 A1* | 2/2017 | von Borcke-Morawitz | |
| | | | G01C 21/18 |
| 2018/0050822 A1* | 2/2018 | Herring | B64D 47/08 |
| 2018/0084160 A1* | 3/2018 | Miyashita | G03B 17/561 |

\* cited by examiner

DEVICE MOUNT

FIELD OF THE INVENTION

The present invention relates to mounts for mounting equipment. The invention has particular application for mounting cameras and in a specific embodiment for mounting a camera to an aircraft, unmanned autonomous vehicle, drone or the like. While the present summary indicate these applications specifically, the person skilled in the art will readily understand that the mount can be used for mounting other types of devices to other types of equipment.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to mount a device that allows the angle and orientation of the device to be adjusted through a wide range;

the ability to provide a sturdy device mount that transmits minimal vibration to the device;

provide a mount that can be easily configured for different devices.

These and other advantages may be realized by reference to the remaining portions of the specification, claims, and abstract.

BRIEF DESCRIPTION OF ONE EMBODIMENT OF THE PRESENT INVENTION

In one aspect of the present invention, there is provided a mount for a device. The mount may comprise a ring clamp and a rotational element that is able to rotate within the ring clamp to a selectable orientation prior to being clamped in position by the ring clamp. The rotational element may include one or more attachments for attaching to the device.

In one aspect of the present invention, there is provided a mount for a device. The mount may comprise rotational mount means for receiving and securing the device. The mount may also comprise ring clamp means for clamping the rotational mount means in a selectable orientation.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
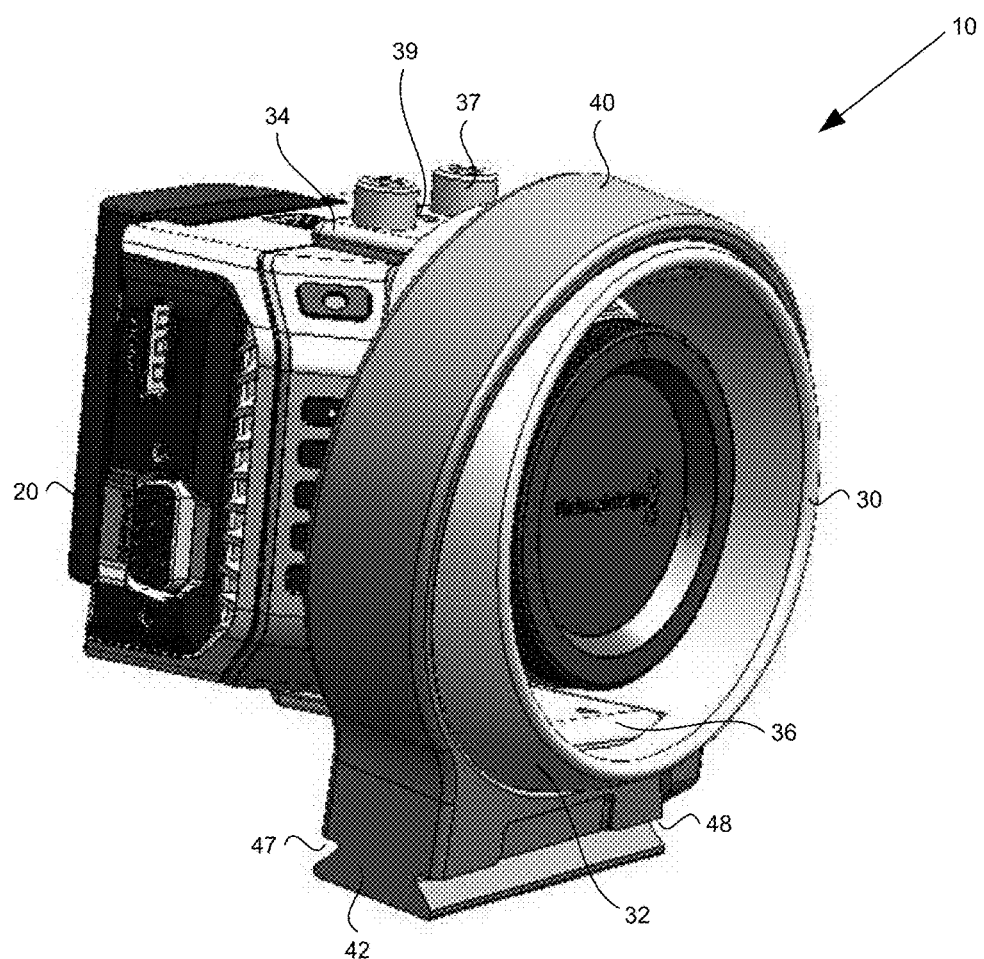
FIG. 1 substantially shows a camera in a mount in accordance with an embodiment of the present invention.
Figure 2:
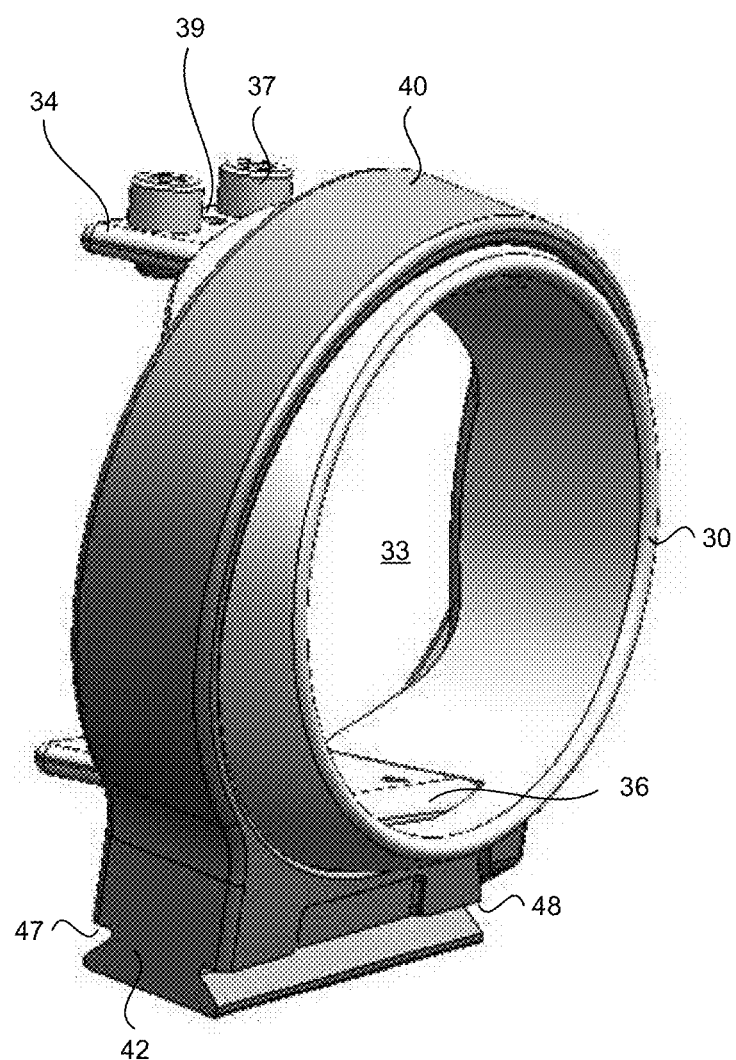
FIG. 2 substantially shows the mount without the camera.

In FIG. 1, there is shown an equipment mount 10 in accordance with an embodiment of the invention. FIG. 1 shows the mount 10 in use with a camera 20 though it is to be understood that the camera 20 does not form a part of the invention and that the mount may be used to mount other types of devices.

Figure 3:
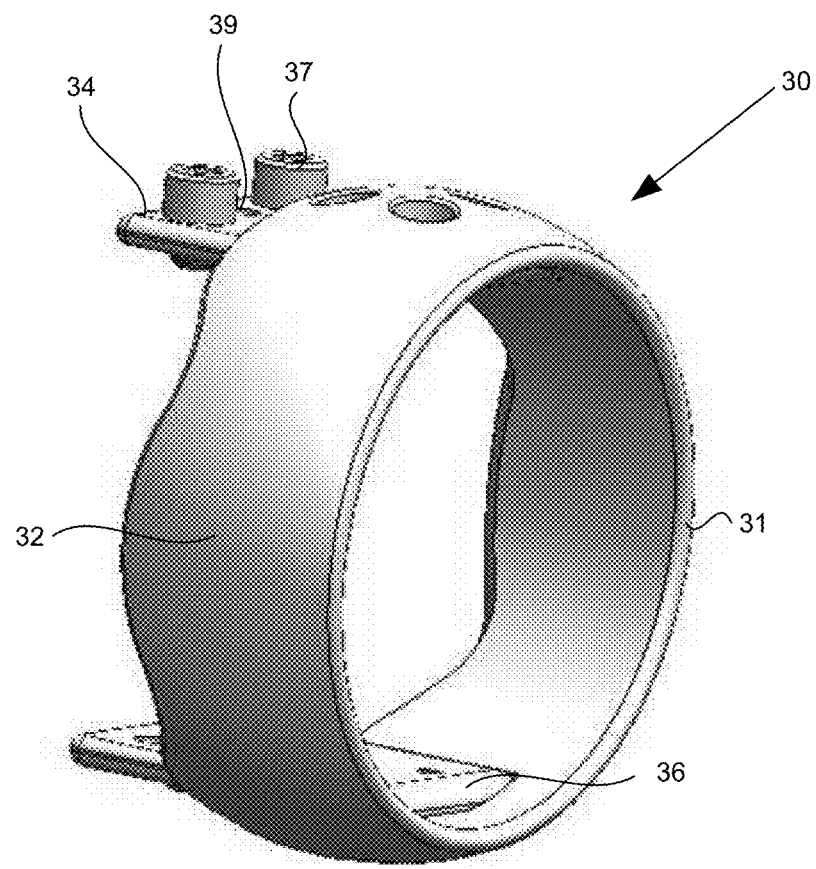
FIG. 3 shows a front perspective of a ball piece.
Figure 4:
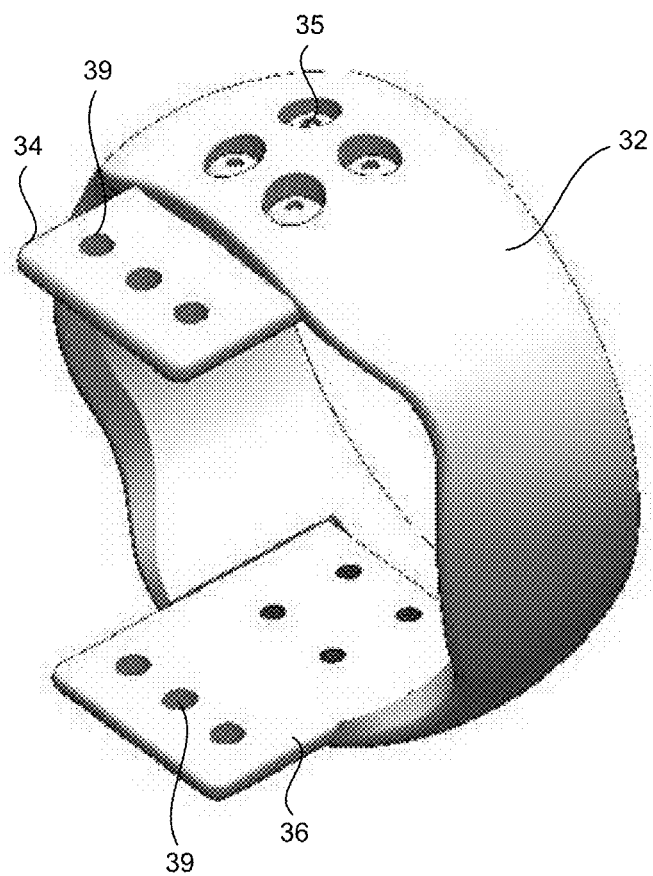
FIG. 4 substantially shows a rear perspective of the ball piece.

The mount 10 includes a rotational element such as a ball section 30 that provides for an attachment to the camera 20, or other device. An embodiment of a ball section 30 is shown in isolation in FIGS. 3 and 4. The ball section 30 may have at least one degree of circular symmetry that allows for rotation of the ball around at least one axis. In the embodiment of FIGS. 3 and 4, the ball section is a partial sphere having a circumferential outer wall 31 defining an inner space 33 that accommodates the device 20 in use. The outer surface 32 of the outer wall 31 may have a spherical shape that provides at least one outer contact surface for a ring clamp as will be described in more detail below.

The ball 30 may include attachments for attaching to the device. In various embodiments, the attachments may include attachment pieces, slots, openings, etc that engage with and secure the relevant device. Different balls 30 and/or different attachments may be configured for specific devices. The attachments may rely on screws, press fits, detents, etc. In the present embodiment of FIGS. 3 and 4, the attachments include two attachment pieces 34, 36 that are attached to the inner circumference of the ball 30 by screws 35 or similar fasteners (FIG. 4). The attachment pieces may be removable from the ball 30.

The attachment pieces 34, 36 may be configured at the back end for attachment to a particular device 20. For example, different brands or models of cameras 20 may have threaded holes for mounting the cameras to tripods, stands, harnesses or the like. In the present example, the back end of the attachment pieces 34, 36 include three adjacent holes 39 that may accommodate screws 37 or similar fasteners to attach the device 20 to the attachment pieces 34, 36 depending on the specific device 20. All three holes 39 may be used to mount the device 20 or different combinations of holes may be used. If the hole pattern is not appropriate for mounting a particular device 20, the attachment pieces 34, 36 may be replaced with attachment pieces that accommodate the particular device 20. Furthermore, while the attachment pieces illustrated accept the top and bottom surfaces of the camera 20, the person skilled in the art will recognize that different attachment pieces may be made to accommodate the sides or other surfaces of the device 20 by rotating the ball piece 30.

Figure 5:
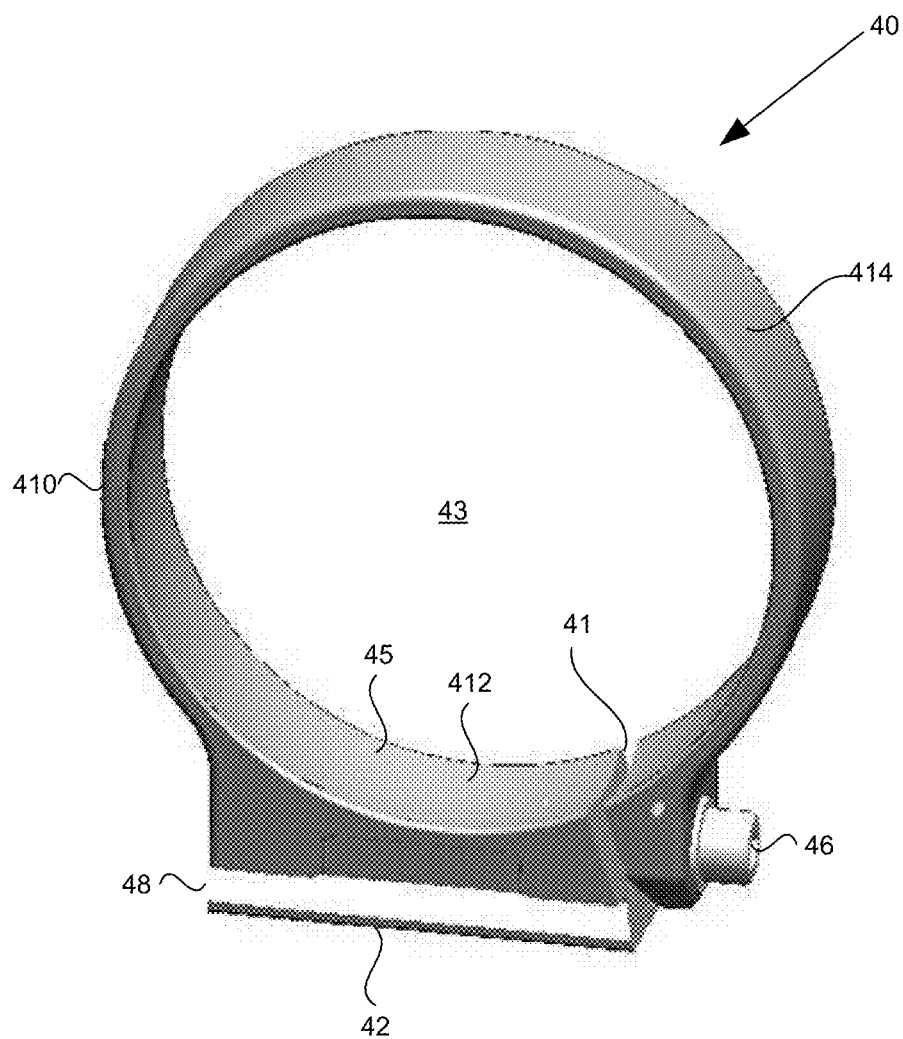
FIG. 5 substantially shows a front perspective of a ring clamp.
Figure 6:
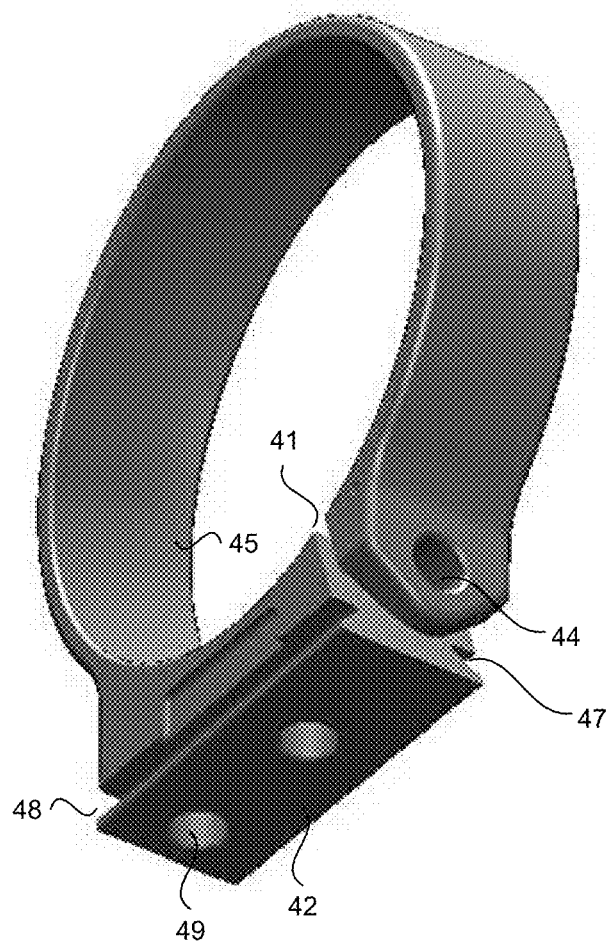
FIG. 6 substantially shows a lower perspective of the ring clamp.

The mount 10 includes a ring clamp or bracket 40 that receives the rotational element 30 within an aperture 43 defined by an inner circumference 45 of the ring clamp 40. The ring clamp 40 is shown in isolation in FIGS. 5 and 6. The ring clamp 40 includes a ring defined by a circumferential wall 410. The wall 410 has an inner surface 412 and an outer surface 414. The wall 410 extends for a particular length from the front to the back that is sufficient to secure the rotational element 30 within the clamp 40 as will be described in more detail below.

The clamp 40 includes an expansion joint provided by a split 41 in the ring circumference. At a base 42 of the ring clamp, there is a hole 44 that penetrates the base 42 from one side of the split 41 to the other. At least a portion of the hole 44 is threaded and receives a screw 46 or similar that closes and tightens the ring clamp 40. The inner surface 412 of the ring clamp 40 is sized to approximately match the outer contact surface 32 of the ball 30. The inner surface 412 provides an inner contact surface and may have a profile or shape that matches the profile or shape of the rotational element 30. For example, for the rotational element 30 of the embodiments of FIGS. 3 and 4 which has a substantially spherical outer contact surface, the inner surface 412 of the clamp 40 may have a corresponding spherical surface. Alternatively, the inner surface 412 may be more generally cylindrical. The ball 30 may be received within the ring clamp, oriented to the appropriate orientation, and then the ring clamp 40 may be tightened around the ball 30 by tightening the screw 46, thereby setting the orientation of the ball 30 within the clamp 40. The ball 30 has sufficient rigidity and strength such that when the ball 30 is squeezed by the ring clamp 40 it does not collapse but instead, frictional contact is created between the clamp 40 and the ball 30 that is sufficient to prevent the ball 30, with device 20 mounted thereto, from shifting within the clamp 40 until the clamp pressure is released via screw 46.

The spherical surface of the ball allows the ball to rotate left/right, up/down and forward/back within the ring clamp 40 prior to the ring clamp being tightened around the ball section 30. Thus a large range of orientations about three orthogonal axes may be selected via the rotational element 30.

The rotational element 30 may have a single continuous contact surface around its circumference, as is shown by the continuous wall 31 in FIGS. 3 and 4. Alternatively, the rotational element 30 may comprise a plurality of discrete and distinct contact surfaces comprising multiple discontinuous spherical sections around the periphery. Such an arrangement may be created to accommodate particular devices, or for aesthetic reasons.

One or both of the inner and outer contact surfaces may have additional friction enhancing elements or features including, without limitation, coatings, roughened surfaces, coupling elements and the like. Alternatively or in addition, the contact between the inner and outer contact surfaces may be provided with one or more vibration dampening elements or features.

The base 42 is shaped and configured to provide engagement with a larger equipment to which the mount 10 may be removably affixed. The larger equipment may be a fixture or a moving structure such as a vehicle, drone, or any suitable moving element. In one embodiment, the base 42 may be dove tail or wedge shaped and define two grooves 47, 48. The equipment to which the mount 10 may be fixed may include a slot that has a complimentary shape to the base 42 that allows the base 42 to slide within the slot for retaining the mount 10 and device 20 to the larger equipment. Additional holes 49 may be provided in the base 42 for attaching the mount 10 to the equipment. The person skilled in the art will recognize that other base shapes and/or other methods for attaching the mount 10 to equipment are possible. Additional clamps or locking and securing elements may be used to retain the base 42 in its particular mount.

The mount 10 as described herein provides flexibility in mounting various devices 20 to equipment. The ball piece 30 is able to rotate within the ring clamp 40 through a wide range of angles. The ball piece is further able to provide a wide range of attachments to various devices.

Figure 7:
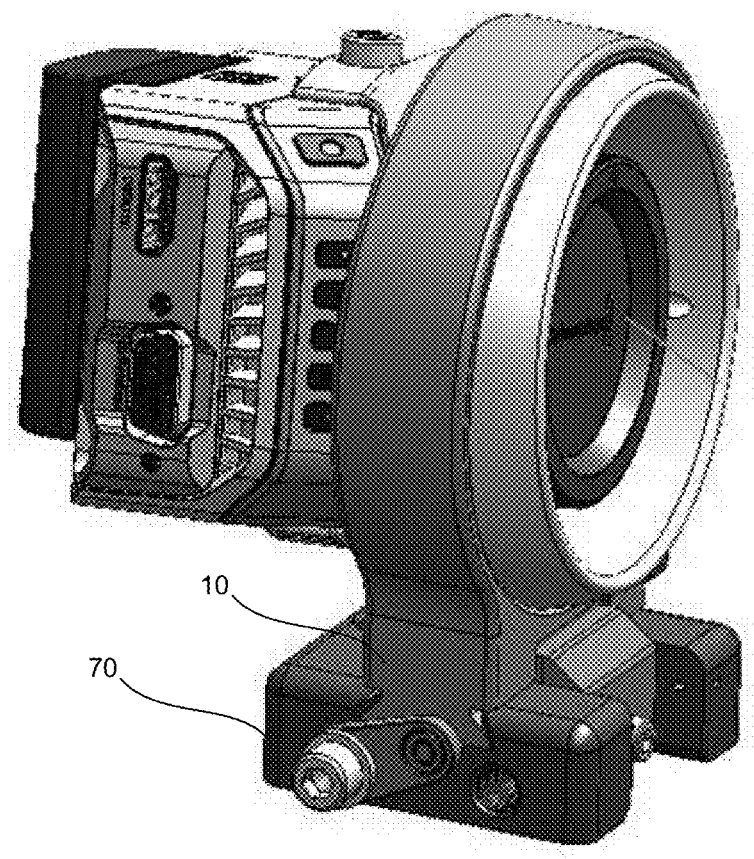
FIG. 7 substantially shows a base mount for receiving the mount and device.
Figure 8:
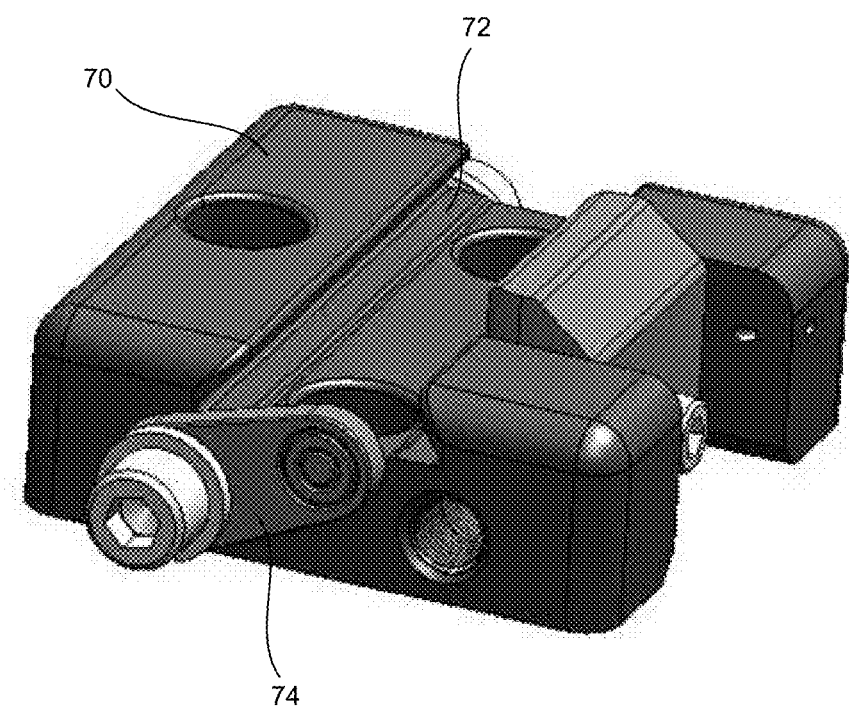
FIG. 8 substantially shows the base mount in isolation.

FIGS. 7 and 8 show the mount 10 engaging a lower base 70. The lower base 70 includes a slot 72 having a complementary shape to the dovetail section of the mount 10. A locking mechanism 74 can be operated to lock the mount 10 within the slot 72.

Figure 9:
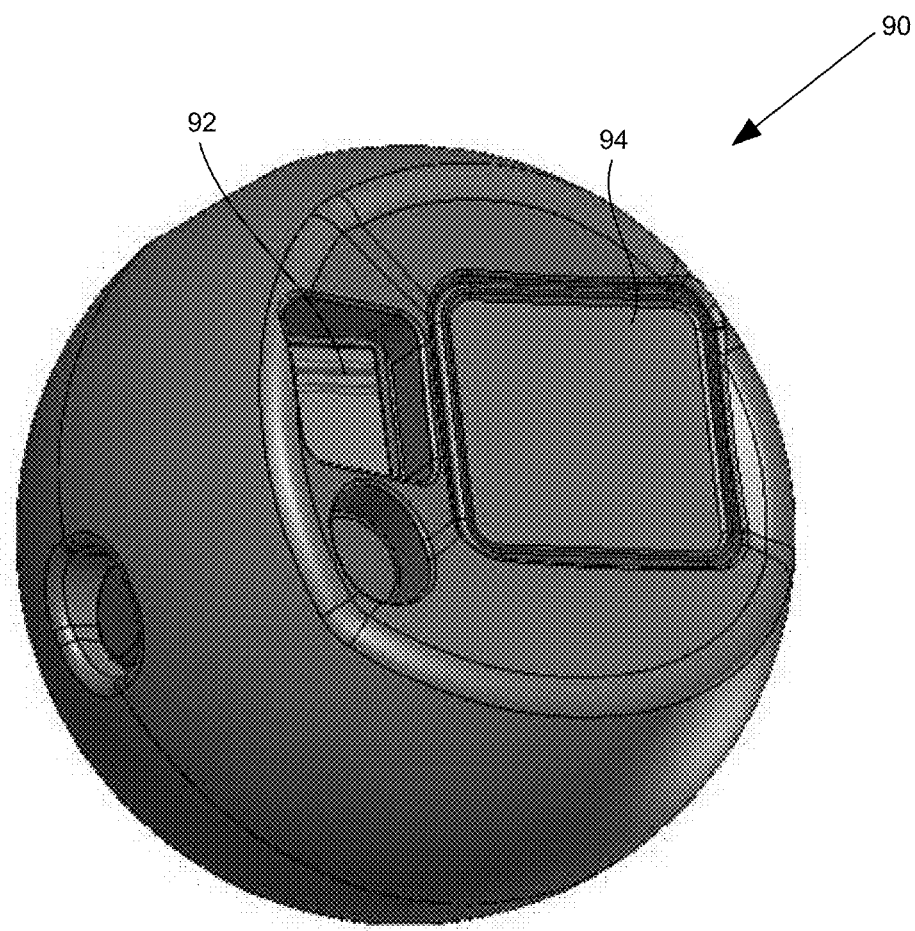
FIG. 9 substantially shows a first alternative rotational element.

FIG. 9 shows an alternative ball piece 90. The ball piece 90 includes slots 92 and apertures 94 for receiving and engaging with the device rather than external attachment pieces, though attachment pieces may also be provided.

Figure 10:
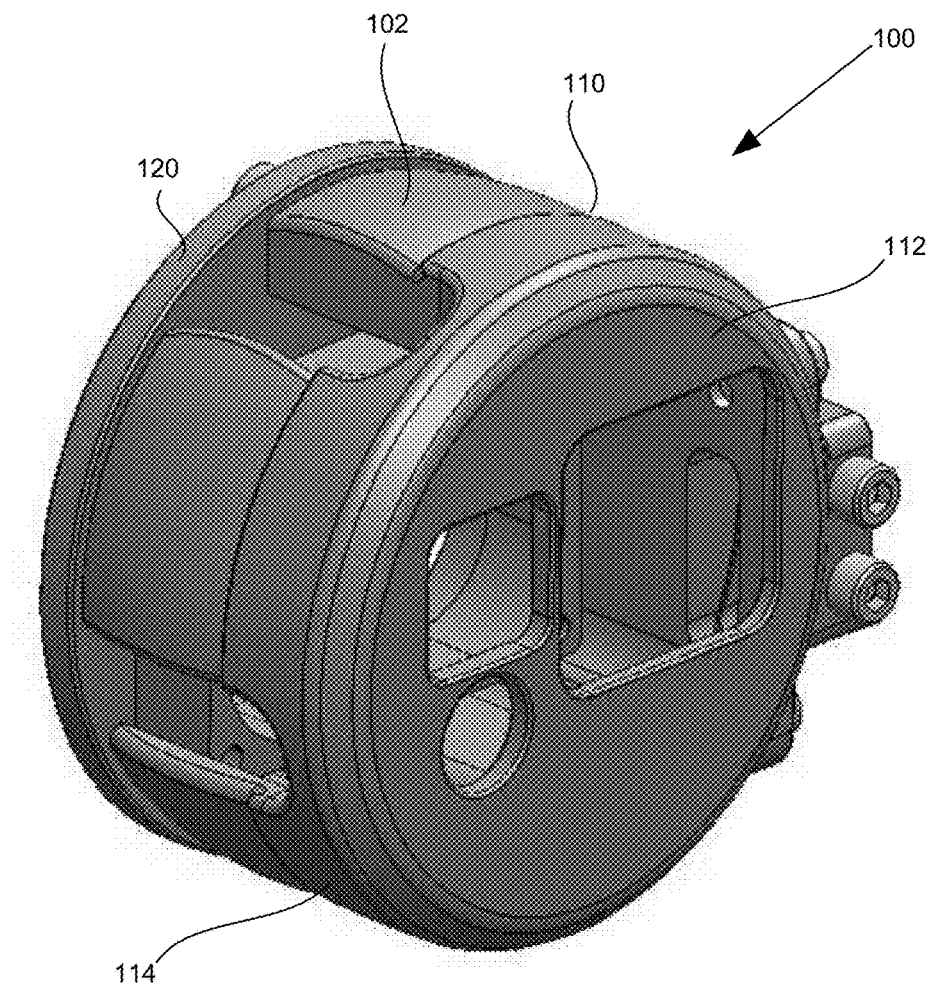
FIG. 10 substantially shows a second alternative rotational element.

FIG. 10 shows a further embodiment of a rotational element. In this embodiment, the rotational element 100 has a generally cylindrical body 110 with circular end walls 112 and an internal cavity that accommodates a camera or similar device. The side wall 114 of the cylindrical body 112 includes a groove 102 around a circumference of the cylindrical body that accommodates the ring clamp. The groove 102 provides an outer contact surface to engage the inner contact surface of the ring clamp. The ring clamp may have a generally cylindrical inner contact surface that matches the profile of the groove 102. In this embodiment, forward/back and left/right rotational adjustment is prevented but the ball is still able to rotate around the longitudinal axis of the ring clamp.

Figure 11:
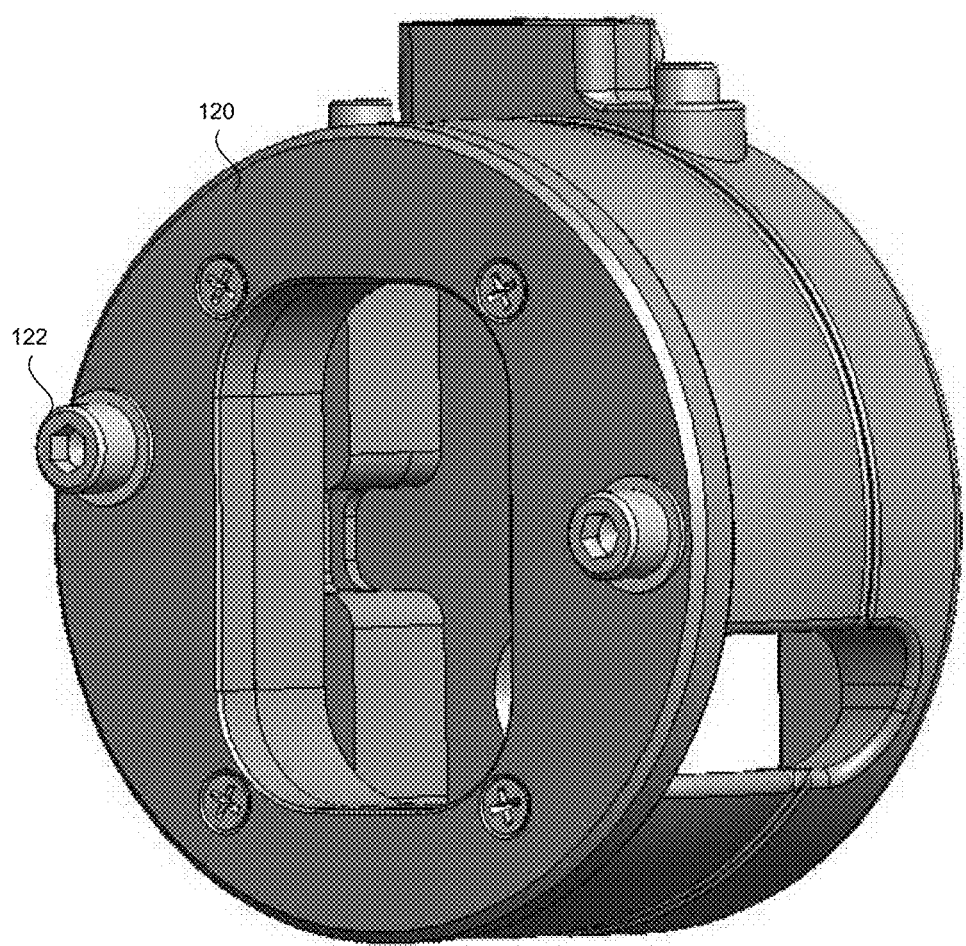
FIG. 11 substantially shows a rear view of the rotational element of FIG. 10.

A rear view of the ball piece 100 is shown in FIG. 11. The body 110 may have a removable back plate 120 that when removed, allows devices and components to be provided into the internal cavity of the body 110. These devices and components can be secured by re-fixing the back plate 120 to the body 110 using screws 122.

It will be understood by the person skilled in the art that terms of orientation such as top, bottom, front, back, left, right, inner, outer, etc. are used herein with reference to the drawings in order to provide a clear and concise description. Such terms are not intended to limit the examples and embodiments in any manner and the scope of the invention as defined herein will encompass other possible orientations of the components as will be perceived by the person skilled in the art.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A mount for a device, the mount comprising:
   (A) a rotational element configured to be attached to the device, the rotational element comprising at least one outer contact surface, wherein the rotational element comprises a ball section and wherein the at least one outer contact surface comprises a portion of a sphere;
   (B) a ring clamp comprising at least one substantially circumferential wall defining a circumference and an aperture within the circumference, the at least one circumferential wall comprising at least one inner contact surface, the ring clamp configured to receive the at least one rotational element within the circumference and clamp the rotational element via clamping contact between the at least one inner contact surface and the at least one outer contact surface;
   (C) wherein the rotational element can be clamped within the ring clamp in a selectable orientation.

2. The mount of claim 1 comprising one or more attachments for attaching the rotational element to the device.

3. The mount of claim 2 wherein the one or more attachments are removable from the rotational element.

4. The mount of claim 1 wherein the inner contact surface comprises a partially spherical surface.

5. The mount of claim 1 wherein the ring clamp comprises an expansion joint.

6. The mount of claim 1 wherein the rotational element is rotatable within the ring clamp about at least two orthogonal axes.

7. The mount of claim 6 wherein the rotational element is rotatable within the ring clamp about at least three orthogonal axes.

8. The mount of claim 1 wherein the rotational element comprises a continuous outer contact surface around a circumference of the rotational element.

9. The mount of claim 1 wherein the rotational element comprises a cavity for receiving the device therein.

10. The mount of claim 9 comprising a removable plate that provides access to the cavity.

11. The mount of claim 1 wherein the ring clamp comprises an attachment for securing the ring clamp to a larger element.

12. A mount for a device comprising:
   (A) rotational mount means for receiving and securing the device;
   (B) ring clamp means for clamping the rotational mount means in a selectable orientation,
   (C) wherein the rotational mount means comprises outer contact surface means for contacting the inner contact surface means and wherein the outer contact means comprises a partially spherical surface.

13. The mount of claim 12 wherein the ring clamp means comprises inner contact surface means for contacting the rotational mount means.

14. The mount of claim 12 wherein the outer contact means is continuous around a circumference of the rotational mount means.

15. The mount of claim 12 comprising attachment means for attaching the device to the rotational mount means.

16. A mount for a device, the mount comprising:
   (A) a rotational element configured to receive and secure the device to the rotational element, the rotational element comprising:
      (i) at least one outer contact surface;
      (ii) a cavity for receiving the device therein; and
      (iii) a removable plate that provides access to the cavity; and
   (B) a ring clamp comprising at least one substantially circumferential wall defining a circumference and an aperture within the circumference, the at least one circumferential wall comprising at least one inner contact surface, the ring clamp configured to receive the at least one rotational element within the circumference and clamp the rotational element via clamping contact between the at least one inner contact surface and the at least one outer contact surface;
   (C) wherein the rotational element can be clamped within the ring clamp in a selectable orientation.

17. A mount for a device, the mount comprising:
   (A) a rotational element configured to receive and secure the device to the rotational element, the rotational element comprising at least one outer contact surface;
   (B) a ring clamp comprising at least one substantially circumferential wall defining a circumference and an aperture within the circumference, the at least one circumferential wall comprising at least one inner contact surface, the ring clamp configured to receive the at least one rotational element within the circumference and clamp the rotational element via clamping contact between the at least one inner contact surface and the at least one outer contact surface;
   (C) wherein the rotational element can be clamped within the ring clamp in a selectable orientation,
   (D) wherein the rotational element is generally cylindrical and wherein the rotational element comprises a groove around a circumference of the rotational element that is configured to receive and contact the ring clamp.

* * * * *